US008156028B2

(12) United States Patent  (10) Patent No.: US 8,156,028 B2
Bishop et al.  (45) Date of Patent: *Apr. 10, 2012

(54) TECHNOLOGY PORTFOLIO HEALTH ASSESSMENT SYSTEM AND METHOD

(75) Inventors: Fred Bishop, Glendale, AZ (US); Sherry McCullough Easterwood, Mesa, AZ (US); Pradeep Varghese George, Scottsdale, AZ (US); Robert Del Gilmore, Peoria, AZ (US); James Walker Mathews, Salt Lake City, UT (US); Lawrence J. Mitsch, Saint Paul, MN (US); James Robert Rottman, Plymouth, MN (US); James Denis Thornton, Plymouth, MN (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/219,944

(22) Filed: Aug. 29, 2011

(65) Prior Publication Data

US 2011/0313949 A1  Dec. 22, 2011

Related U.S. Application Data

(63) Continuation of application No. 10/907,319, filed on Mar. 29, 2005, now Pat. No. 8,027,903.

(51) Int. Cl.
*G06Q 40/00* (2012.01)
(52) U.S. Cl. ....................................................... 705/35
(58) Field of Classification Search ..................... 705/35
See application file for complete search history.

(56) References Cited

U.S. PATENT DOCUMENTS 6,557,008 B1 * 4/2003 Temple et al. .................... 1/1
2005/0065841 A1 * 3/2005 Middleton ..................... 705/11

OTHER PUBLICATIONS

USPTO; Office Action dated Sep. 25, 2008 in U.S. Appl. No. 10/907,319.
USPTO; Final Office Action dated Mar. 5, 2009 in U.S. Appl. No. 10/907,319.
USPTO; Advisory Action dated May 6, 2009 in U.S. Appl. No. 10/907,319.
USPTO; Office Action dated Sep. 3, 2009 in U.S. Appl. No. 10/907,319.
USPTO; Final Office Action dated Mar. 18, 2010 in U.S. Appl. No. 10/907,319.
USPTO; Advisory Action dated Jun. 1, 2010 in U.S. Appl. No. 10/907,319.
USPTO; Notice of Allowance dated May 27, 2011 in U.S. Appl. No. 10/907,319.

* cited by examiner

*Primary Examiner* — Jessica Lemieux
(74) *Attorney, Agent, or Firm* — Snell & Wilmer L.L.P.

(57) ABSTRACT

A system and method for producing infrastructure health assessments enabling enterprises to monitor the health of individual technology portfolios and plan accordingly is disclosed. The tool uses two primary assessments to determine: 1) an infrastructure score based the general health of asset components; and 2) adaptability score based on asset components ability to interact with other elements within the asset. To generate the assessment scores, the tool accepts inventory input specific to a portfolio's assets and components. A user interacting with the tool provides classification information relating to each asset and component. The tool then calculates health assessment scores for both individual portfolio assets and for the portfolio as a whole.

22 Claims, 6 Drawing Sheets

| | Asset Details | | Infrastructure Assessment | | | | |
|---|---|---|---|---|---|---|---|
| | | | Server Operating System | | | Desktop Operating System | | Protocols / |
| Asset | Asset Life Cycle | Importance | Server OS Selection | Server OS Comments | Desktop OS Selection | Desktop OS Comments | Desktop OS Selectio |
| Asset001 | Invest | Mission Critical | Windows 2000 Server | | | | Windows 2000 Server |
| Asset003 | Maintain | Critical | | | | | |
| Asset004 | Maintain | High | | | | | |
| Asset006 | Disinvest | High | | | | | |
| Asset002 | Invest | High | | | | | |
| Asset007 | Exit | Low | | | | | |

Buttons: HOME, Print Preview Selected Row, Infrastructure Selections

Labels: 300, 305, 310, 315, 320, 325, 330, 335, 340, 345

Figure 4

Asset Details

| Asset | Asset Life Cycle | Importance |
|---|---|---|
| Asset001 | Invest | Mission Critical |
| Asset003 | Maintain | Critical |
| Asset004 | Maintain | High |
| Asset006 | Disinvest | High |
| Asset002 | Invest | High |
| Asset007 | Exit | Low |

Adaptability Assessment

| Asset Targets | | | Component Based, Service Oriented | | | Message | |
|---|---|---|---|---|---|---|---|
| Next SQP Period Target | POA Target | Target Comments | Leverage/ Reuse | Reus-ability | CSBO Comments | Message Enabled | Message Format |
| 4.1 | 5 | | 4.1 | 5 | | 1 | 4 |
| 3 | 4 | | 3 | 4 | | 3 | 4 |
| 3 | 2 | | 3 | 2 | | 3 | 5 |
| 4.3 | 5 | | 4.3 | 5 | | 2 | 3 |
| 2.5 | 2 | | 2.5 | 2 | | 1 | 3 |
| 4.2 | 3 | | 4.2 | 3 | | 3 | 3 |

HOME | Print Preview Selected Row | Infrastructure Selections

Figure 5

TECHNOLOGY PORTFOLIO HEALTH ASSESSMENT SYSTEM AND METHOD

RELATED APPLICATION

This invention is a continuation of, and claims priority to, U.S. Ser. No. 10/907,319 filed on Mar. 29, 2005 and entitled "TECHNOLOGY PORTFOLIO HEALTH ASSESSMENT SYSTEM AND METHOD".

FIELD OF THE INVENTION

The invention generally relates to a technology profile health assessment, and more particularly, to a system and method for evaluating infrastructure health and adaptability for technology assets within an enterprise.

BACKGROUND OF THE INVENTION

Enterprises that are working to maintain and protect their investments in information technology (IT) infrastructure have long sought and developed methodologies leading to greater utilization of assets, increased asset capacity and more intelligent integration with newer assets. However, as is frequently the case, enterprises instead adapt their business strategies to their IT infrastructure capacity. That is, if the current IT infrastructure does not support particular business initiatives, then those initiatives are often canceled, postponed or modified to fit current IT capacity. Obviously, this is not an optimal model for today's business environment. Enterprises recognizing that technology investments should be driven by business initiatives and technology requirements, rather than vice versa, will likely build a solid foundation from which to build and maintain their businesses.

Supporting an existing IT infrastructure while determining future technology investments is not always a straightforward proposition, especially for large enterprises. There are many interdependencies and variables that often need to be considered prior to committing to infrastructure investments. Determination of how an investment will affect or compliment the current technology infrastructure is vital to the infrastructure growth and migration plan of the enterprise. Because IT portfolio assets often comprise many individual elements, an IT portfolio manager may falsely assume that an asset is healthy when an overwhelming number of the components are healthy. However, this is not always the case. A single unhealthy asset component among many healthy components can render the entire asset unhealthy.

Therefore, a need exists for a system and method for assessing the health of a technology portfolio as well as the assets contained therein. More specifically, enterprises need a tool to enable portfolio managers to thoughtfully evaluate the current state of a portfolio in order to accurately plan and prioritize future projects, including purchases. Moreover, a need exists for a tool that will provide a detailed health assessment at the asset component level where a more precise understanding of an asset's health can be determined.

SUMMARY OF THE INVENTION

The invention enables better decisions relating to business critical technology investments, wherein the decisions are based upon the underlying technology and architecture adaptability of technology portfolio assets, while directly linking to an enterprise's business initiatives and goals. The process centers on reoccurring information technology health assessments which enable the creation of a scoring baseline of portfolio application inventories by the currency and the adaptability of technology assets. The process further identifies technology investments required to uplift obsolete infrastructure and inflexible architecture in order to create a standardized and stabilized technical environment that is compliant, secure, adaptive and cost-effective. The resultant assessment assigns a weighted average score for both infrastructure and architecture health for the application asset. Based on the target score for each asset, the asset owner is able to identify and prioritize future technology driven investment decisions. The assessment results complement the IT Strategy, migration/mitigation planning, Strategic Quality Plan (SQP) forecasting and Technology Consumption Management (TCM).

An exemplary Information Technology Health Assessment (ITHA) has two primary components, namely the infrastructure assessment and the adaptability assessment. The infrastructure assessment creates an infrastructure scorecard for application portfolios, while the adaptability assessment provides an adaptability scorecard based on individual dimensions within a group of specific categories. More particularly, the ITHA develops a first asset score for an infrastructure assessment of an asset; develops a second asset score for an adaptability assessment of the asset; calculates a first portfolio score for an infrastructure assessment of the portfolio based on the first asset score; and, calculates a second portfolio score for an adaptability assessment of the portfolio based on the second asset score.

BRIEF DESCRIPTION OF THE DRAWINGS

A more complete understanding of the invention may be derived by referring to the detailed description and claims when considered in connection with the Figures, wherein like reference numbers refer to similar elements throughout the Figures, and:

DETAILED DESCRIPTION OF EXEMPLARY EMBODIMENTS

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

In general, the invention includes a system and method for identifying and tracking required technology infrastructure and architecture. The invention accepts input relating to current technology portfolios and utilizes mathematical weighting conventions to create assessments of each portfolio.

Figure 1:
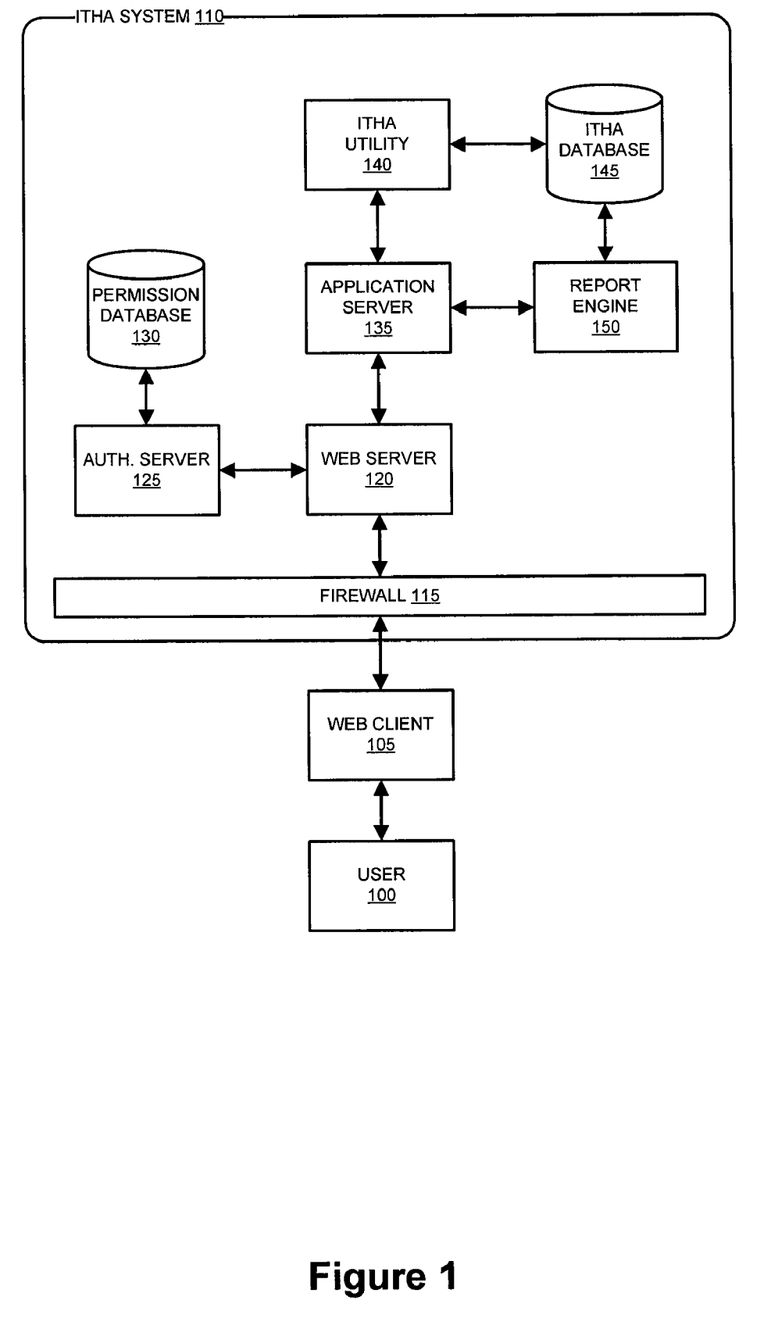
FIG. 1 is a block diagram illustrating major system components for an exemplary tool for information technology health assessment according to one embodiment.

With reference to FIG. 1, in one embodiment, the invention facilitates interaction between user 100 and ITHA system 110 through a web client 105. Web client 105 is connected to a web server 120 through a network connection (e.g., Internet, Intranet, LAN, WAN). Web server 105 may employ an authentication server 125 in order to validate and assign proper permissions to authorized users of the system. Permission database 130 stores user credentials and permissions specific to each user. Web server 120 also employs an applications server 135 to manage various applications utilized by the system. Application server 135 may be a standalone server or may comprise software residing within web server 120.

In one embodiment, ITHA utility 140 is invoked by application server 135 to accept portfolio specific data and calculate an adaptability score and infrastructure score. ITHA utility 140 stores data relating to health assessments within ITHA database 145. ITHA utility 140 also interfaces with a report engine 150 to generate pre-configured and/or ad-hoc reports relating to one or more portfolio health assessments.

In addition to the components discussed above, ITHA system 110 may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; asset data; enterprise data; merchant data; financial institution data; and/or like data useful in the operation of the invention.

Referring now to FIGS. 2-5 the process flows and screenshots depicted are merely embodiments of the invention and are not intended to limit the scope of the invention as described herein. For example, the steps recited in any of the method or process descriptions may be executed in any order and are not limited to the order presented. It will be appreciated that the following description makes appropriate references not only to the steps and user interface elements depicted in FIGS. 2-5, but also to the various system components as described above with reference to FIG. 1.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Figure 2A:
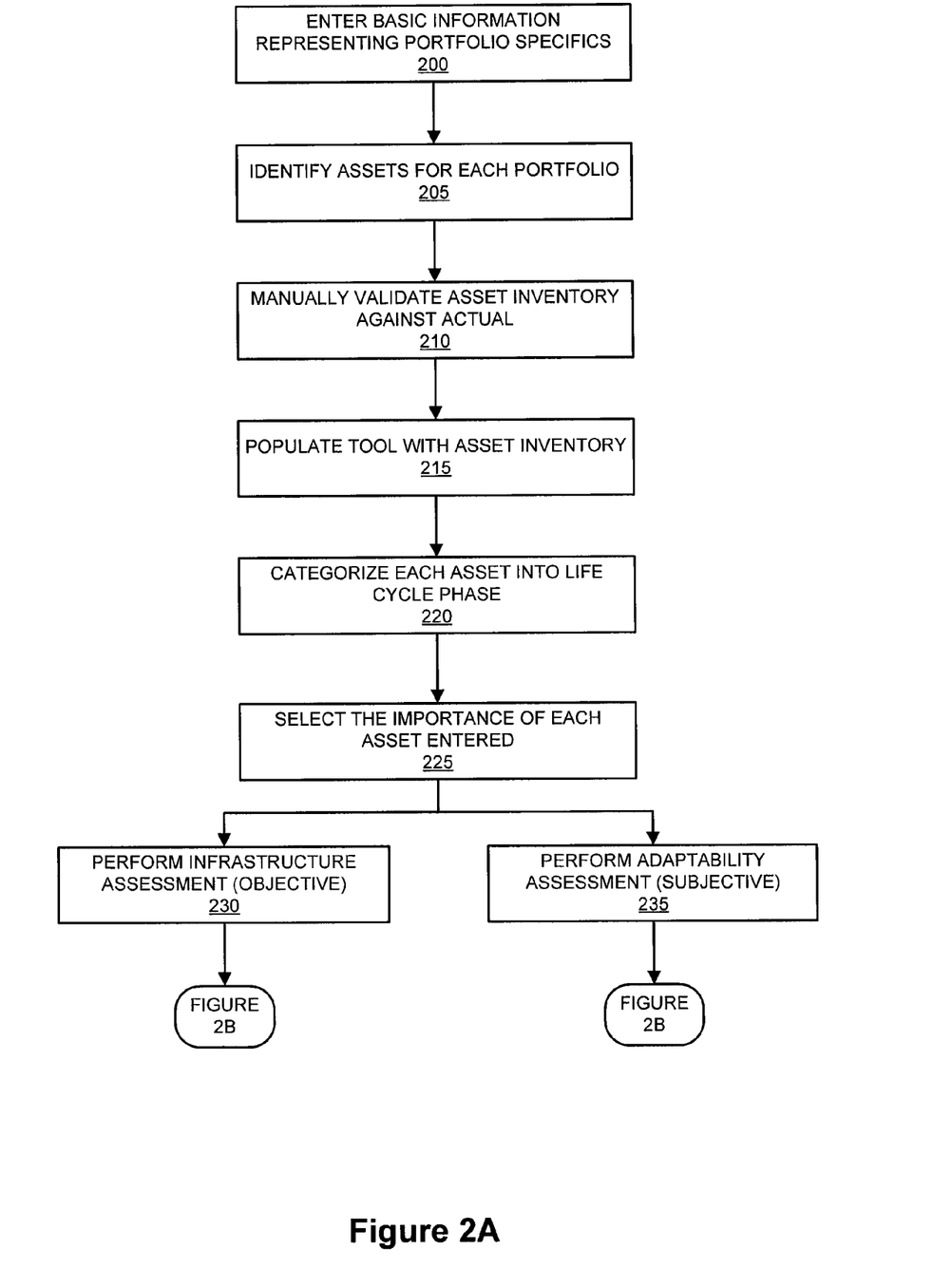
FIGS. 2A and 2B is a flowchart illustrating an exemplary process for interacting with the invention through a user interface according to one embodiment.

FIG. 2A is a flowchart illustrating an exemplary process for interacting with the ITHA system 110 through a user interface. The invention may implement known methods for preventing access from unauthorized users such as, for example, requiring users to register and/or by assigning authentication credentials to individual users. In one embodiment, the invention includes an authentication server 125 which is incorporated to enforce security policies by allowing varying levels of access to users based on such policies. Internet security protocols such as, for example, methods of authentication and user management, are well known in the art, therefore the invention may employ any number of security architectures and an authentication process will not be described in detail herein.

To enter portfolio specific information into ITHA system 110, user 100 is presented with a screen or dialog to enter information to be used to identify the portfolio (step 200). Such information may include, for example, a name of the portfolio, portfolio description, cost center, portfolio manger, contact name and number, email address, assessment period and the like. After identifying the portfolio, user 100 identifies all or any portion of assets (i.e. applications, systems and components) within the portfolio (step 205). This may include, for example, reviewing an inventory report, purchase orders, maintenance records and the like. As a matter of policy, an enterprise may further require manual validation of each asset prior to inputting the assets into ITHA system 110 interface (step 210).

Figure 2B:
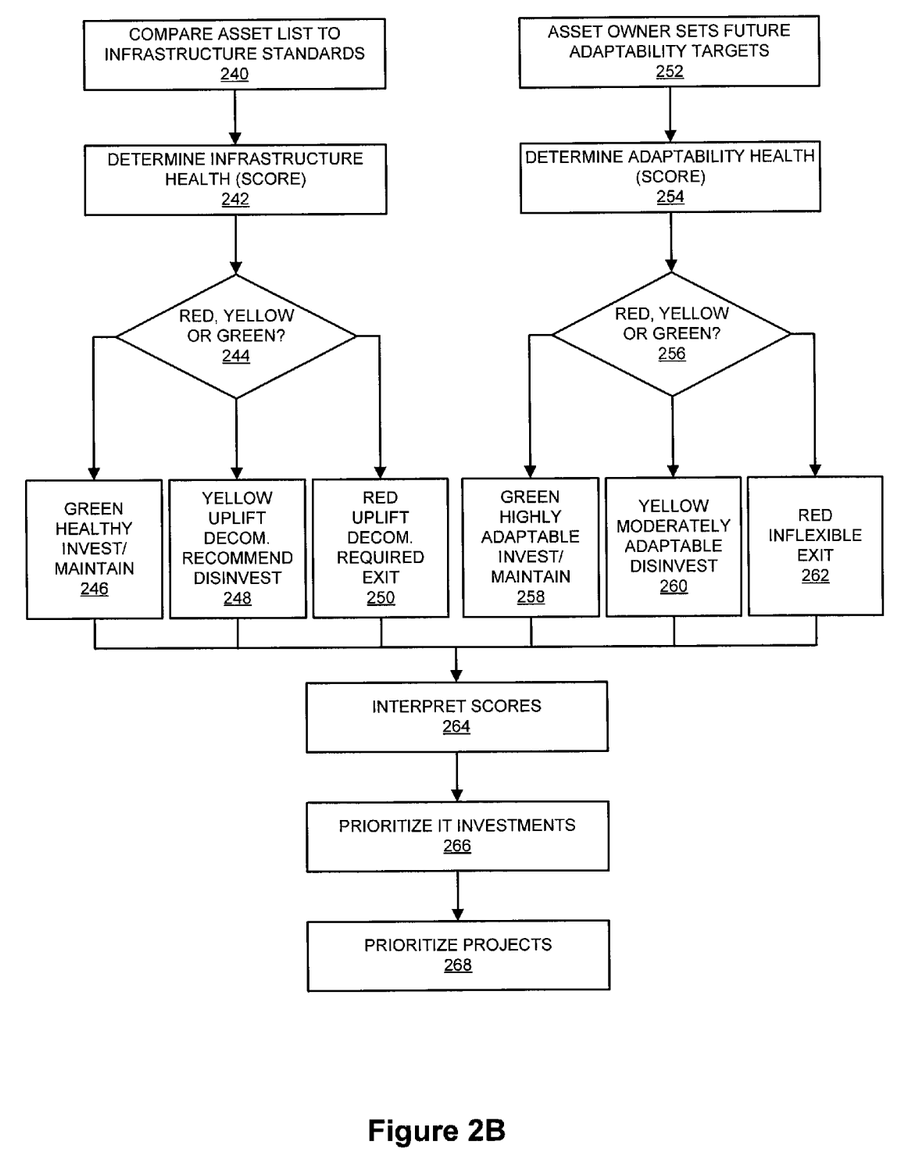
Figure 3:
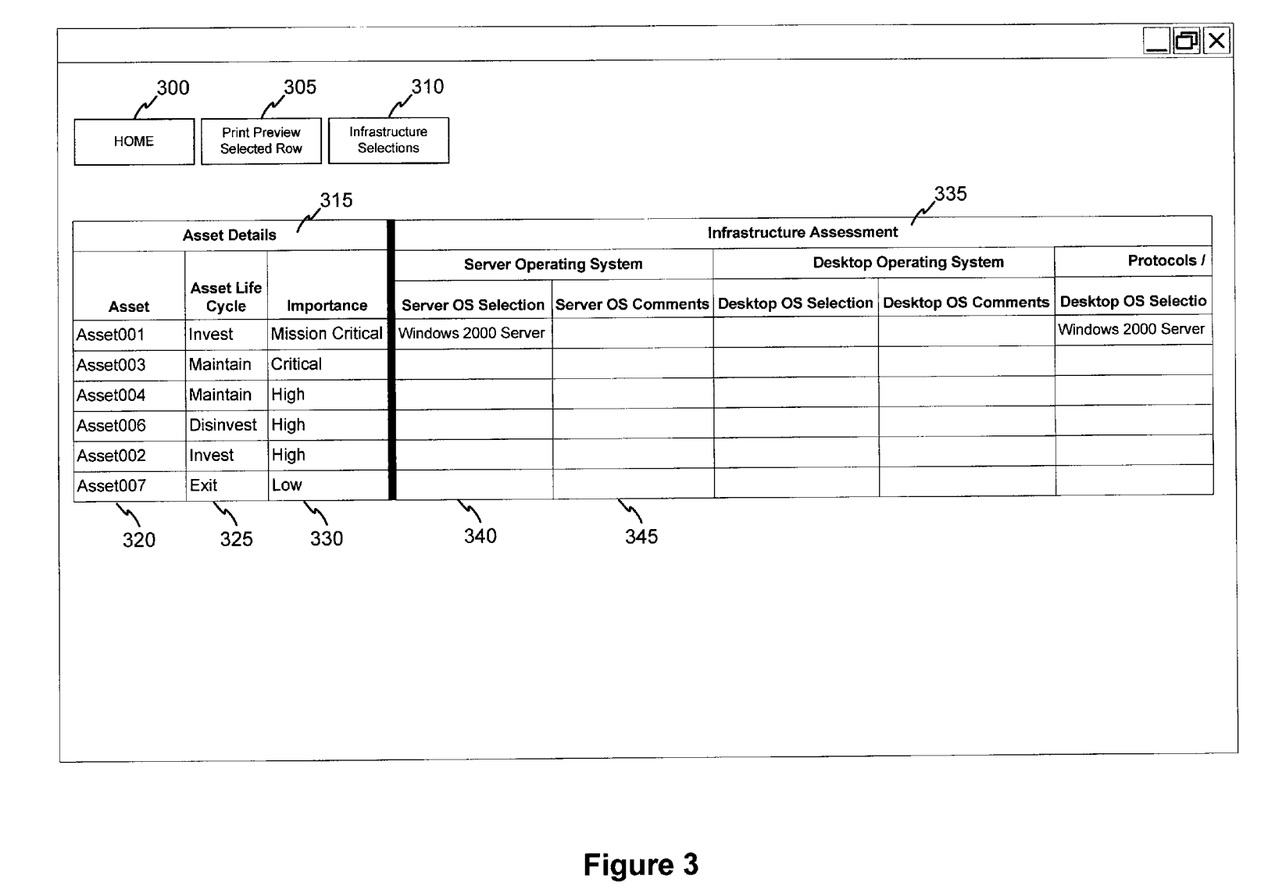
FIG. 3 is a screenshot of an exemplary interface for entering assets and asset component inventories into an interface according to one embodiment.

With occasional reference to FIGS. 2 and 3, in one embodiment, user 100 enters asset details 315 by assigning a unique portfolio asset name within an asset column of a grid 320 to identify each asset individually (step 215). A portfolio asset may be an application, system, or component which is owned, managed or otherwise controlled by the portfolio. Defining a portfolio may be enterprise specific, however specific practices may lead to a more accurate portfolio health assessment. For example, an "account web site" portfolio may include a Windows 2000 server and a number of external hard drives, hubs, routers and other networking devices. However, each of those individual components may contain any number of other assets. The Windows 2000 server may contain a SQL Server DBMS, an authentication server, an applications server, a report engine, a firewall, etc. The account web site may further access an accounts mainframe in order to provide customers with account balances, statements, and the like. Even though the account web site accesses the services of the accounts mainframe, the accounts mainframe should not be considered part of the account web site portfolio in one embodiment, even though the health of the mainframe may impact the health of the portfolio.

For each asset entered within the asset column 320, the user selects the asset life cycle phase 325 from a dropdown list (step 220). While asset life cycle phases may be uniquely defined among different enterprises, an example life cycle phase may contain the following options: Research and Development, Preinvest, Invest, Maintain, Disinvest and Exit. The invention may further include a field or cell to enter asset lifecycle comments.

Another determining factor which may be used by the tool in its calculation of the portfolio score is an importance criterion which includes the relative importance of the asset within the portfolio. This may be determined by considering what the impact of losing the asset would have on the portfolio. The user may select the importance of the asset 330 from a dropdown list (step 225). Importance selections include, for example: "low", "medium", "high", "critical" and "mission critical."

In one embodiment, ITHA system 110 includes two main assessment categories for which assets are ultimately scored. Infrastructure assessment is highly objective and provides an overview of the degree of variation between each asset and pre-defined standards. The adaptive architecture adaptability assessment is subjective in nature and provides criteria for defining and measuring the adaptability of an asset's architecture. Levels of adaptability are defined using critical architectural attributes including, for example, flexibility, layering, interoperability, data, and reuse. Both assessment categories will be described in greater detail herein.

The infrastructure assessment captures the relationships between assets and system software used within the portfolio. To perform the infrastructure assessment (step 230), the user selects the asset and then selects a link or button 310 to open a new window or dialog displaying a list of specific software products and versions. The software products may be grouped into categories such as, for example, server operating system, desktop operating system, DBMS, middleware, applications server, mainframe utilities, etc. From the list, user 100 selects all items that apply to the selected asset. When selection is complete, user 100 may select a link or button to populate the assets infrastructure assessment section 335 for the selected asset.

In another embodiment, the user interface may provide a dropdown box for each software grouping from which user 100 may make a selection. For example, a dropdown box within the "Server OS Selection" column of the interface 340 may list, for example, Windows 2000 Server, Windows NT 4.0, RedHat Linux 3.0, Mac OS and the like. Further, the interface provides a field where user 100 may enter comments relating to the selection 345.

In order to view and/or print infrastructure information in report form, user 100 selects an asset from the list and selects a link or button to preview the selected row 305. A report showing the status of the asset is displayed to user 100 within a new window of dialog. In one embodiment, the report is color coded according to a standard technology life cycle phase. In another embodiment, a code indicative of the standards technology life cycle phase appears next to each infrastructure element. Each category displayed within the report (e.g., Server OS, Desktop OS, DBMS, etc.) includes a number proceeding the category name which is a value used to calculate the current infrastructure score.

Figure 4:
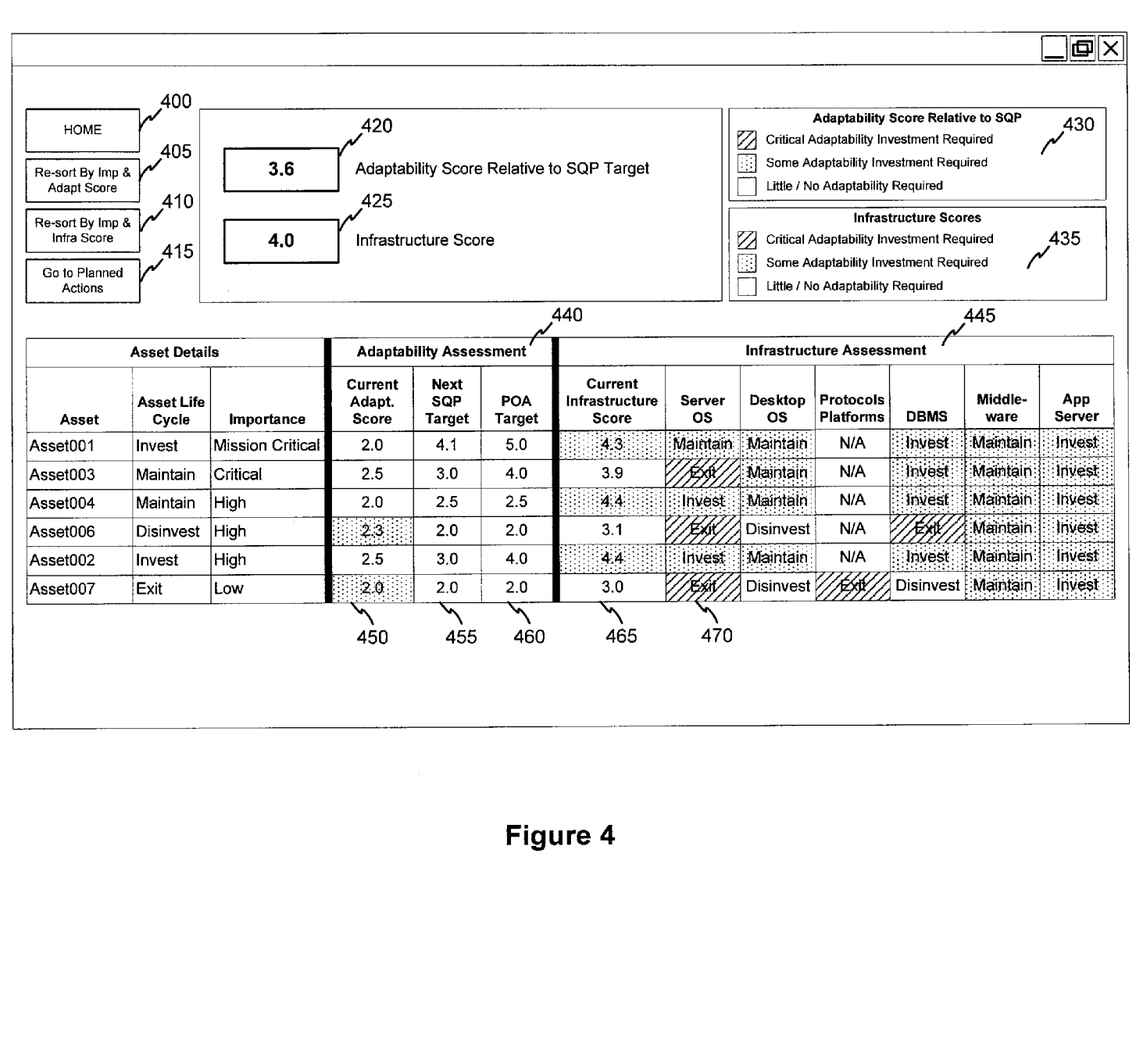
FIG. 4 is a screenshot of an exemplary interface for viewing details relating to the adaptability and infrastructure assessments according to one embodiment.

With occasional reference to FIGS. 2 and 4, infrastructure information may also be viewed in tabular form within an infrastructure asset assessment model summary page where a similar color coding scheme as described above is applied to the adaptability assessment 440 and infrastructure assessment table cells 445. The infrastructure asset assessment model is a tool for evaluating the health of assets within the portfolio. More specifically, the model provides a system and method for measuring the infrastructure of an asset. Levels of infrastructure health for each dimension follow the stages of the technology life cycle used in accordance with an enterprise's standards: R&D, Preinvest, Invest, Maintain, Other (Non-standard), Disinvest, Exit and Not Applicable (N/A).

The summary page displays the assets with a calculated score for each asset. ITHA utility 140 calculates the scores by, for example, by comparing the asset list to infrastructure standards which are imbedded within infrastructure characteristics (step 240). Infrastructure standards may reside as business rules within ITHA system 110. A standards list is used to guide technology purchasing. At any point in time and for every type of technology product, the standards list indicates what products may be purchased, what previously purchased products may still be used, and what previously purchased products are now obsolete and require replacement. User 100 may sort the listing further by selecting a re-sort button which resorts the asset list. Once sorted, the summary page displays the mission critical assets with lower scores 465 at the top and low importance assets with higher scores at the bottom 465. The assets are sorted in the order of importance 480 (descending) followed by infrastructure score 465 (ascending). This sequence brings the more important but relatively unhealthy assets (those requiring further analysis and creation of uplift plans) to the top of each importance group 480.

The status of each asset element 470 may be classified according to the standards of the enterprise. However, according to an exemplary embodiment, ITHA system may employ exemplary business rules defining levels of health as follows:

Exit: Continued use of the product is a risk to the integrity of operations and ongoing customer support. Vendor support may already be withdrawn. Uplift immediately (within 1 year or by enterprise mandated date).

Disinvest: Vendor support will be withdrawn in a short period of time (less than 18 months). Plans must be in place to migrate from these products toward the invest standard (within 2 years).

Pre-Invest: Products in pre-invest status are likely to become invest standards but transition to invest cannot be assumed. Operational readiness is often specific to the application/individual case. No action is necessary if it is believed appropriate to continue the usage of this product.

Other: The product in use is not in the standards list. Product might be (Other-Current) the most current version from the vendor and hence quite healthy and well supported (no action required) OR might be an older version but still supported by the vendor (uplift recommended) OR the product is currently unsupported or support is likely to be withdrawn in a short period of time (less than 18 months) by the vendor (Uplift plans must be in place). Any time "Other" is selected in a dropdown list, the product name and version should be recorded in the corresponding comment field.

R&D: In general, no application portfolio should be employing any technology that is in R&D status, as R&D status is non-production. However, other than confirming the need to use an R&D product, no action is required.

Maintain: Acceptable for continued use in a production environment, although new applications should not be deployed on these platforms (use invest products). No action is required.

Invest: Approved standard product and full operational readiness may be assumed and hence no action is required.

Not Applicable: Asset does not use a product for this category; hence no action is required.

ITHA utility 140 calculates the current infrastructure health score (step 242). The current infrastructure score is determined by adding together all of the points from all technology categories and then dividing that number by the total possible points. For example, each technology category may be scored a value of up to 5 points. If there are nine technology categories, then the combined score of all nine categories is divided by 45 (i.e. 9 categories*5 possible points=45) to derive a current infrastructure health score for each asset. The current infrastructure score 465 is indicative of the scores for all applicable categories of the asset, normalized to a five-point scale with respect to the ideal score of the asset (which is the score obtained if all categories were "invest"). The score 465 is normalized to enable comparison between the health of varying assets. A score of "5" indicates that all applicable dimensions of the asset employ products that are in perfect health ("invest") and a variance from the perfect score of "5" indicates that there are one or more unhealthy products within the asset's infrastructure. Therefore, the asset score 465 in conjunction with the asset importance 480 may be employed to prioritize portfolio uplift investments. The current infrastructure score is used to color code and set the asset element classification (step 244). For example, the following categorization rules may be employed by ITHA utility: Score<2 then "Uplift/Decommission Required" (step 246), Score>=2<4 then "Uplift/Decommission Recommended" (step 248), Score>=4 then "Invest/Maintain" (step 246).

At a higher level, the portfolio infrastructure score 420 indicates the weighted average of the scores for all assets by relative importance. To derive the portfolio infrastructure score 420, each of the portfolios assets infrastructure scores are multiplied by their respective importance weights. Then the sums of these values are divided by the sum of all of the weighting values to produce the portfolio infrastructure score 420 which is then normalized to a five-point scale to enable comparison between the health of different portfolios within an enterprise. A score of "5" means all the assets within a portfolio have perfect health and a variance from the portfolio score from "5" indicates there are unhealthy products in the portfolio's infrastructure. The portfolio score 420 in conjunction with the importance of the portfolio can be used to prioritize portfolio uplift investments across portfolios within an enterprise.

ITHA system 110 may further provide a text field where user 100 may enter planned actions relating to an asset. A planned action is entered in accordance with an asset to ensure that assets requiring attention are anticipated and planned for. User 100 may select a link or button 315 to open a new window or dialog containing a test entry field. After entering a planned action, user 100 may select a button to add the action to the asset record for the portfolio.

As previously noted, the ITHA utility 140 includes two main assessment categories for which assets are ultimately scored. The first, performing infrastructure assessment (step 230), has been described above. The second assessment category that ITHA utility 140 performs is an adaptability assessment (step 235). Adaptability assessment includes, for example, establishing a baseline for each asset with respect to adaptability, defining a target level of adaptability for the assets, establishing interim milestones, and creating project and migration plans to support the goals of the enterprise. While infrastructure can be assessed using checkboxes and dropdown lists, adaptability lies on a continuum and must be assessed qualitatively.

The asset adaptability assessment is based on the portfolio adaptability assessment which will be described in greater detail herein. A set of dimensions that measure conformance to the enterprises adaptive architecture have been grouped into categories for use in ITHA utility 140. Each dimension is scored over a five-point range where 1 indicates non-adaptive (inflexible) state and 5 indicates highly adaptive. Descriptions are given for the 1, 3, and 5 values; user 100 may select 2 and 4 for states in between. These ratings are used to calculate an overall adaptability rating for the asset. Moreover, the adaptive architecture asset adaptability assessment provides criteria for defining and measuring the adaptability of an asset architecture. Levels of adaptability are defined using critical architectural attributes including, for example, flexibility, layering, interoperability, data, and reuse. The following scale example may be employed by the invention to communicate the adaptability at the portfolio level.

Level 1: Inflexible technology may cause business initiatives to be delayed, scaled back and/or abandoned. An asset at this level has made little or no progress towards migrating to an adaptive architecture.

Level 2: Similar to level 1, except that some tangible progress towards an adaptive architecture can be demonstrated.

Level 3: Moderately more adaptable to changing business requirements. An asset at this level has made significant progress towards migrating to the adaptive architecture and, as a result, is less of an obstacle for business initiatives. Depending upon the target level of adaptability that has been established, the asset may have completed the transformation to an adaptive architecture.

Level 4: Easy to adapt to the changing business environment. Capabilities provided on the asset may no longer be on the critical path of business initiatives.

Level 5: Highly adaptable and can easily be used by applications without customization, and the asset has become a building block that may be reused in new and/or redesigned business processes. This enables aggressive near-term business initiatives. Level 5 represents world class adaptability and is the recommended target for core (e.g., product engines) and strategic assets.

Figure 5:
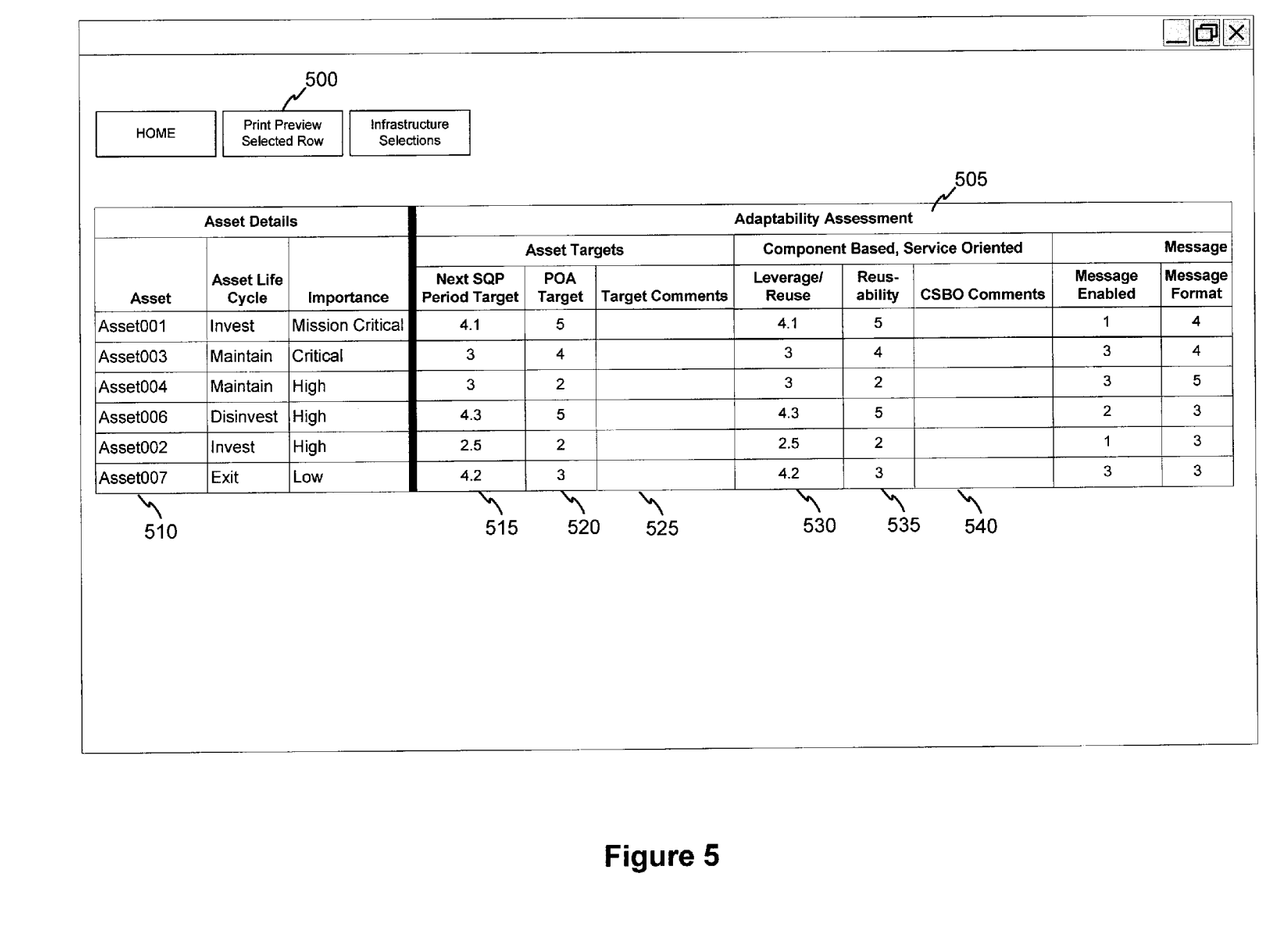
FIG. 5 is a screenshot of an exemplary interface for entering scores to perform an adaptability assessment according to one embodiment.

To enter adaptability ratings, in one embodiment, user 100 may select a link or button to open a new window or dialog including a table similar to that of FIG. 3. With reference to FIGS. 2 and 5, the user 100 may enter adaptability ratings into the fields or cells of an asset information input table. User 100 begins by determining the scores for the individual dimensions within each of the categories. These scores are entered as integers in the range of 1 to 5, and will be used to calculate the current adaptability score of the asset. Each dimension is scored over a five-point range where 1 indicates a non-adaptive (inflexible) state and 5 indicates a highly adaptive state. Descriptions are given for the 1, 3, and 5 values; however for states in between, user 100 may enter the 2 and 4 values. These ratings are used to calculate an overall rating for the asset, which is a weighted average of the dimensions. Weighting values are derived according to the assessed value of the asset to an enterprise (i.e. mission critical=5, critical=4, high=3, medium=2, low=1). Each adaptability category's score is multiplied by its weighting value. Then each of these values are summed and divided by the sum of total possible score. A comment cell 525 within each category enables user 100 to enter explanations of the score, or identification of the project that will address this specific dimension, or other comments.

While practitioners will appreciate that the invention may include any number of adaptability categories, the following are presented for the purpose of explanation only and are not intended to limit the scope of the invention. Further, it should be understood that adaptability categories may be applied to assets and asset components, and while all components are assets in of themselves, not all assets will qualify as components.

"Leverage/Reuse" measures how well the asset is reusing capabilities provided by other assets in the enterprise environment including: enterprise and shared components and infrastructure capabilities. More reuse results in lower development costs and fewer lines of code in the environment, which lowers the cost to the business. "Reusability" measures how much of the potentially reusable capability of the asset has been made available for reuse by other assets in the environment. This ultimately reduces the total lines of code in those assets, again reducing expense "Message Enabled" measures how much progress has been made toward making the asset message enabled both as a provider and as a consumer of services. To be highly adaptable, the asset must use messages for all appropriate inbound and outbound communication. Using messages eliminates tight coupling between assets, greatly reducing the cost of modifying assets. "Message Format" measures how much progress has been made toward eliminating dependence on legacy record formats and converting the asset to using the Canonical Message Format (CMF). CMF isolates assets from changes in other assets, greatly reducing the cost of modifying assets.

"Interaction Levels" measures how much progress has been made toward implementing the interaction level principles. Two factors are examined: converting interfaces to use the appropriate interaction level for the type of communication between the assets and ensuring the appropriate usage of managed point-to-point interfaces. Loose coupling isolates assets from changes in other assets, greatly reducing the cost of maintaining and modifying assets.

"Configurability" measures how much progress has been made toward making the asset responsive to changes in business process by moving business process decisions and inflection points out of program code and into tables and rules engines. This reduces the cost of modifying business processes and improves time to market for changes. "Extensibility" measures how much progress has been made toward being able to extend functionality and data structures while maintaining backward compatibility. This reduces the cost of modifying business processes by eliminating any need to synchronize the modification of other assets with this one.

"Layering" measures how much progress has been made toward the three layer architecture (Interaction, Process and Base/Data) described in the enterprise adaptive architecture. The layered structure groups similar functionality together, simplifying design and development. When layers only communicate with assets in adjacent layers, loose coupling is enhanced. This reduces development and maintenance costs.

"Data Integrity" measures how much progress has been made toward preserving data integrity by eliminating instances where the asset directly updates data owned by another asset rather than invoking the data services provided by the asset. Data integrity issues can result in inaccurate information being delivered to customers and/or to the business. "Data Replication" measures how much progress has been made toward eliminating data replication that is not managed and controlled by the data of record owning asset. Data replication issues can result in inaccurate information being delivered to customers and/or to the business.

"Availability" measures how well the asset meets availability Service Level Agreements (SLA). A SLA is derived from an enterprises customer expectation for technology capability. Assets must consistently meet or exceed availability SLAs to ensure smooth functioning of enterprise business operations. "Performance" measures how well the asset meets performance SLAs. Assets must consistently meet or exceed performance SLAs to ensure timely completion of the enterprise's business operations.

Following entry of the adaptability measures described above, user 100 enters the Point of Arrival (POA) target 520. The POA target represents the culmination of portfolio requirements that are determined by appropriate levels of adaptability. The POA target may be somewhat subjective in that it is based on business need and technology capability. When the POA target 520 has been assigned, the user 100 may determine the next SQP period target 515. This should be less than or equal to the POA Target 520, and is an indication of how much progress in improving the asset adaptability the portfolio plans to make in the coming SQP period.

The number of transitions required to move the asset to the POA Target 520 is influenced by, for example, the difference between the POA Target 520 and the current adaptability score 450, the availability of funding for the asset, and the impact of this asset's adaptability on other assets. For assets requiring multiple transitions, the portfolio creates a multi-year transition plan for all invest assets to bring them up to the POA Target 520.

User 100 may view the current adaptability score for the asset and to gain an overview of the asset status by selecting the print preview selected row link or button 500 which invokes ITHA utility 140 to update calculations and display a window or dialog displaying the adaptability summary. The adaptability summary displays the current adaptability score for the asset as well as color-coded ratings for the different dimensions, grouped by category. This sheet may be used to identify dimensions requiring investment (those colored red or possibly yellow) in the next SQP period.

Referring again to FIG. 4, user 100 may also view the adaptability score in tabular form within the portfolio summary window as in the description of the infrastructure score. The summary window displays the assets with calculated current adaptability score 450 for each asset. Assets are initially displayed according to business importance (descending order) and then by current adaptability score (ascending). User 100 may sort the listing further by selecting a re-sort link or button 405. Once sorted, the summary sheet displays the mission critical assets with lower scores at the top and low importance assets with higher scores at the bottom. The assets are sorted in the order of importance 480 (descending) followed by adaptability score 450 (ascending). This sequence moves the more important but relatively inflexible assets (those requiring more analysis and creation of uplift plans) to the top of each importance group 480. The overall adaptability score for the portfolio is displayed in the adaptability score relative to SQP target field 420.

While the steps outlined above represent a specific embodiment of the invention, practitioners will appreciate that there are any number of computing algorithms and user interfaces that may be applied to create similar results. The steps are presented for the sake of explanation only and are not intended to limit the scope of the invention in any way.

As will be appreciated by one of ordinary skill in the art, the invention may be embodied as a customization of an existing system, an add-on product, upgraded software, a standalone system (e.g., kiosk), a distributed system, a method, a data processing system, a device for data processing, and/or a computer program product. Accordingly, the invention may take the form of an entirely software embodiment, an entirely hardware embodiment, or an embodiment combining aspects of both software and hardware. Furthermore, the invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

User 100 may include any individual, business, entity, government organization, software and/or hardware which interacts with the invention to input portfolio asset information within a web interface in order to invoke ITHA utility 140 to provide a health assessment. User 100 may be, for example, a portfolio owner, project manager, administrator or any other individual who has is familiar with one or more portfolios. User 100 may interface with ITHA system 110 via many communications protocol, device or method discussed herein or known in the art. In one embodiment, user 100 may interact with the invention via an Internet browser at a web client 105.

Web client 105 may comprise any hardware and/or software suitably configured to facilitate input, receipt and/or review of any information related to ITHA system 110 or any information discussed herein. Web client 105 may include any device (e.g., personal computer), which communicates (in any manner discussed herein) with the invention via any network discussed herein. Such browser applications comprise Internet browsing software installed within a computing unit or system to conduct online transactions and communications. These computing units or systems may take the form of a computer or set of computers, although other types of computing units or systems may be used, including laptops, notebooks, hand held computers, set-top boxes, workstations, computer-servers, main frame computers, mini-computers, PC servers, pervasive computers, network sets of computers, and/or the like. Practitioners will appreciate that web client 105 may or may not be in direct contact with the invention. For example, web client 105 may access the services of the invention through another server, which may have a direct or indirect connection to web server 120.

As those skilled in the art will appreciate, web client 105 may include an operating system (e.g., Windows NT, 95/98/2000, OS2, UNIX, Linux, Solaris, MacOS, etc.) as well as various conventional support software and drivers typically associated with computers. The web client 105 may include any suitable personal computer, network computer, workstation, minicomputer, mainframe or the like. Web client 105 can be in a home or business environment with access to a network. In an exemplary embodiment, access is through a network or the Internet through a commercially available web-browser software package.

Web client 105 may be independently, separately or collectively suitably coupled to the network via data links which includes, for example, a connection to an Internet Service Provider (ISP) as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

The invention contemplates uses in association with web services, utility computing, pervasive and individualized computing, security and identity solutions, autonomic computing, commodity computing, mobility and wireless solutions, open source, service oriented architecture, biometrics, grid computing and/or mesh computing.

Web server 120 may include any hardware and/or software suitably configured to facilitate communications between web client 105 and one or more ITHA system 110 components. Further, web server 120 may be configured to transmit data to web client 105 within markup language documents. Web server 120 may operate as a single entity in a single geographic location or as separate computing components located together or in separate geographic locations. Requests originating from client browser 105 may pass through a firewall 115 before being received and processed at web server 120. As used herein, "transmit" may include sending electronic data from one system component to another over a network connection. Additionally, as used herein, "data" may include encompassing information such as commands, queries, files, data for storage, and the like in digital or any other form. Web server 120 may provide a suitable web site or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system.

Any of the communications, inputs, storage, databases or displays discussed herein may be facilitated through a web site having web pages. The term "web page" as it is used herein is not meant to limit the type of documents and applications that might be used to interact with the user. For example, a typical web site might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service that receives a request from a web server, the request including a URL (http://yahoo.com/stockquotes/ge) and an IP address (123.56.789). The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

In one embodiment, firewall 115 comprises any hardware and/or software suitably configured to protect ITHA system 110 components from users of other networks. Firewall 115 may reside in varying configurations including Stateful Inspection, Proxy based and Packet Filtering among others. Firewall 115 may be integrated as software within web server 120, any other system components or may reside within another computing device or may take the form of a standalone hardware component.

In one embodiment, applications server 135 includes any hardware and/or software suitably configured to serve applications and data to a connected web client 105. Like web server 120, applications server 135 may communicate with any number of other servers, databases and/or components through any means discussed herein or known in the art. Further, applications server 135 may serve as a conduit between web client 105 and ITHA system 110 and web client 105. Web server 120 may interface with applications server 135 through any means discussed herein or known in the art including a LAN/WAN, for example. Application server 135 may further invoke ITHA utility 140 and/or report engine 150 in response to a user 100 request.

In one embodiment, report engine 150 includes any hardware and/or software suitably configured to produce reports from information stored in one or more databases. Report engines are commercially available and known in the art. Report engine 150 may provide printed reports, web access to reports, graphs, real-time information, raw data, batch information and/or the like. The report engine 150 may be implemented through commercially available hardware and/or software, through custom hardware and/or software components, or through a combination thereof. Further, report engine 150 may reside as a standalone system within ITHA system 110 or as a component of applications server 135 or web server 120.

In one embodiment, ITHA utility 140 includes any hardware and/or software suitably configured to accept technology portfolio inputs and generate health assessments. ITHA utility 140 may exist as a standalone computing device or as a software entity stored within applications server 135 or web server 120. ITHA utility 140 may communicate directly or indirectly with one or more computing devices such as mainframe computers, for example. Further, ITHA utility 140 may include business rules such as, for example, weighting of score values, target values, color coding, categories, category dimensions and the like.

In order to control access to web server 120 or any other component of the invention, web server 120 may invoke an authentication server 125 in response to submission of user 100 authentication credentials received at web server 120. In one embodiment, authentication server 125 includes any hardware and/or software suitably configured to receive authentication credentials, encrypt and decrypt credentials, authenticate credentials, and grant access rights according to user 100 pre-defined privileges attached to the credentials. Authentication server 125 may grant varying degrees of application and data level access to user 100 based on user information stored within member database 130. For example, a portfolio owner may be granted access to input and/or modify portfolio data while a systems engineer may be limited to viewing health assessment scores and reports.

In one embodiment, permission database 130 includes any hardware and/or software suitably configured to facilitate storing authentication and/or privilege information relating to users 100. ITHA database 145 stores data relating to portfolio health assessments and reports. One skilled in the art will appreciate that the invention may employ any number of databases in any number of configurations. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the invention by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of the invention, the data can be stored without regard to a common format. However, in one exemplary embodiment of the invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to create, update, delete or augment the data in accordance with the header or trailer. As such, in one embodiment, the header or trailer is not stored on the transaction device along with the associated issuer-owned data but instead the appropriate action may be taken by providing to the transaction instrument user at the standalone device, the appropriate option for the action to be taken. The invention may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the invention may consist of any combination thereof at a single location or at multiple locations, wherein each database or system includes any of various suitable security features, such as firewalls, access codes, encryption, decryption, compression, decompression, and/or the like.

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The invention may be described herein in terms of functional block components, screen shots, optional selections and various processing steps. It should be appreciated that such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, the software elements of the invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. It should be understood that the detailed description and specific examples, indicating exemplary embodiments of the invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

We claim:

1. A computer-implemented method comprising:
developing, by a technological health computer, a plurality of adaptability assessment scores based upon an adaptability assessment of a plurality of assets, including developing a first adaptability assessment score for a first asset, wherein said adaptability assessment is based in part on a compatibility level between existing computing assets and new computing assets, wherein said compatibility level is based upon a reuse measurement, a configurability assessment, a layering measurement and a data integrity measurement; and
determining, by said technological health computer, an impact on a second asset based upon a change to said first asset.

2. The method of claim 1, wherein a change to said first asset comprises at least one of: maintaining said first asset, upgrading said first asset, or eliminating said first asset, to further determine said modification.

3. The method of claim 1, wherein said compatibility level is further based upon an interaction level measurement.

4. The method of claim 1, further comprising, in response to said first adaptability assessment score, at least one of: maintaining said first asset, upgrading said first asset, or eliminating said first asset.

5. The method of claim 1, wherein said developing said first adaptability assessment score comprises weighting said plurality of adaptability assessment asset scores based upon an importance of each asset.

6. The method of claim 1, wherein said developing said first adaptability assessment score comprises developing said first adaptability assessment score for said first asset which includes a component, wherein said component is classified as an adaptability category.

7. The method of claim 1, wherein said developing said first adaptability assessment score comprises developing said first adaptability assessment score for said first asset which includes a component, wherein said component is classified as an adaptability category, wherein said adaptability category includes at least one of a level of adaptability, leverage/reuse, message enabled, message format, interaction levels, configurability, extensibility, layering, data integrity, data replication, availability or performance.

8. The method of claim 1, further comprising entering planned actions for said first asset.

9. The method of claim 1, wherein said developing said plurality of adaptability assessment scores comprises developing using targets associated with said first portfolio.

10. The method of claim 1, further including color coding based upon a category.

11. The method of claim 1, further comprising developing, by said technological health computer, a plurality of infrastructure assessment scores based upon an infrastructure assessment of a plurality of assets, including a first infrastructure score for said first asset.

12. The method of claim 11, wherein said developing said first infrastructure assessment score comprises weighting said plurality of infrastructure assessment asset scores based upon an importance of each asset.

13. The method of claim 11, wherein said developing said first infrastructure assessment score includes developing a first infrastructure assessment score for said first asset which includes a component, wherein said component is classified as at least one of Research and Development, Preinvest, Invest, Maintain, Non-standard, Disinvest, Exit or Not Applicable.

14. The method of claim 11, wherein said developing said first infrastructure score comprises:
identifying said first portfolio;
entering an identifier associated with said first asset;
entering a lifecycle phase associated with said first asset;
assigning an importance level to said first asset;
identifying components of said first asset;
scoring said first asset by comparing said first asset to a standards list to obtain a first asset infrastructure score;
categorizing said first asset according to business rules; and
weighting said first infrastructure score based on importance level.

15. The method of claim 11, further comprising normalizing said first infrastructure score to a five-point scale.

16. The method of claim 1, further comprising creating, based upon said plurality of assets, at least one of investment prioritization and multi-year investment plans.

17. The method of claim 11, wherein at least a portion of said infrastructure assessment scores are determined at the asset component level.

18. The method of claim 1, wherein at least a portion of said adaptability assessment scores are determined at the asset component level.

19. The method of claim 1, wherein said developing said adaptability assessment scores is based upon prior year information about at least a portion of said plurality of assets.

20. The method of claim 1, wherein said developing said adaptability assessment scores is based upon known configuration information about at least a portion of said plurality of assets.

21. A non-transitory tangible computer-readable medium embodying instructions, when executed by a technology health computer, cause said technology health computer to perform operations comprising:
developing, by said technological health computer, a plurality of adaptability assessment scores based upon an adaptability assessment of a plurality of assets, including developing a first adaptability assessment score for a first asset, wherein said adaptability assessment is based in part on a compatibility level between existing computing assets and new computing assets, wherein said compatibility level is based upon a reuse measurement, a configurability assessment, a layering measurement and a data integrity measurement; and
determining, by said technological health computer, an impact on a second asset based upon a change to said first asset.

22. A system comprising:
a technology health processor,
a tangible, non-transitory memory configured to communicate with the processor,
the tangible, non-transitory memory having instructions stored thereon that, in response to execution by the processor, cause the processor to perform operations comprising:

developing, by said processor, a plurality of adaptability assessment scores based upon an adaptability assessment of a plurality of assets, including developing a first adaptability assessment score for a first asset, wherein said adaptability assessment is based in part on a compatibility level between existing computing assets and new computing assets, wherein said compatibility level is based upon a reuse measurement, a configurability assessment, a layering measurement and a data integrity measurement; and determining, by said processor, an impact on a second asset based upon a change to said first asset.

* * * * *